United States Patent
Foster et al.

(10) Patent No.: US 11,939,040 B2
(45) Date of Patent: Mar. 26, 2024

(54) SYSTEMS AND METHODS FOR OPERATING A DOOR OF AN AIRCRAFT

(71) Applicant: THE BOEING COMPANY, Chicago, IL (US)

(72) Inventors: John K. Foster, St. Peters, MO (US); Ryan Binkholder, Webster Groves, MO (US); Thaddeus Jakubowski, Jr., St. Charles, MO (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 17/654,255

(22) Filed: Mar. 10, 2022

(65) Prior Publication Data
US 2023/0002029 A1    Jan. 5, 2023

Related U.S. Application Data

(60) Provisional application No. 63/217,063, filed on Jun. 30, 2021.

(51) Int. Cl.
*B64C 1/14* (2006.01)
*B64C 1/38* (2006.01)
(Continued)

(52) U.S. Cl.
CPC .............. *B64C 1/1461* (2013.01); *B64C 1/38* (2013.01); *B64C 30/00* (2013.01); *B64D 1/06* (2013.01)

(58) Field of Classification Search
CPC ....... B64C 1/1461; B64C 1/38; B64C 1/1407; B64C 1/1415; B64C 1/1423; B64C 1/1469; B64D 1/06; E05D 3/10; E05D 3/14

See application file for complete search history.

(56) References Cited

U.S. PATENT DOCUMENTS 10,767,404 B2 *  9/2020  Spoelstra .................. E05D 3/06
2008/0283677 A1 * 11/2008  Pederson .................. F02K 7/14
                                                                    60/225
(Continued)

FOREIGN PATENT DOCUMENTS

WO      WO-2007065175 A2 *   6/2007  ............... B64G 1/14

OTHER PUBLICATIONS

Kun Long et al. Aircraft skin gap and flush measurement based on seam region extraction from 3D point cloud. Science Direct. Table 2 and p. 6 (Year: 2021).*

*Primary Examiner* — Richard Green
*Assistant Examiner* — Cindi M Curry
(74) *Attorney, Agent, or Firm* — Joseph M. Butscher; The Small Patent Law Group LLC (57) ABSTRACT

A hinge assembly of a system for operating a door of an aircraft includes a bracket secured to a structure of the aircraft. The bracket includes a first forward joint and a first aft joint separated by a first distance along a first line. A forward link is coupled to the first forward joint. An aft link is longer than the forward link, and is coupled to the first aft joint. A door coupler is secured to a door. The door coupler includes a second forward joint and a second aft joint separated by a second distance that is less than the first distance. The second distance is along a second line that is parallel to the first line in a stowed position. The forward link is further coupled to the second forward joint, and the aft link is further coupled to the second aft joint.

20 Claims, 5 Drawing Sheets

(51) Int. Cl.
*B64C 30/00* (2006.01)
*B64D 1/06* (2006.01)

(56) References Cited

U.S. PATENT DOCUMENTS

| | | | |
|---|---|---|---|
| 2013/0221825 A1* | 8/2013 | Bonomie | E05F 3/227 16/303 |
| 2018/0216379 A1* | 8/2018 | Spoelstra | E05D 3/14 |
| 2020/0070946 A1* | 3/2020 | Risch | E05D 11/10 |
| 2020/0300013 A1* | 9/2020 | Chadwell | E05D 11/1057 |

* cited by examiner

SYSTEMS AND METHODS FOR OPERATING A DOOR OF AN AIRCRAFT

CROSS-REFERENCE TO RELATED APPLICATION

This application is a non-provisional application of U.S. Patent Application No. 63/217,063, filed Jun. 30, 2021, and the entire disclosure of which is incorporated herein by reference.

FIELD OF THE DISCLOSURE

Examples of the subject disclosure generally relate to systems and methods for operating a door of an aircraft, and more particularly to systems and methods for opening and closing a door, such as a door of a bay, of an aircraft.

BACKGROUND OF THE DISCLOSURE

Certain aircraft are configured to house stores that can be deployed during flight. For example, certain military aircraft are configured to discharge various types of stores, such as munitions including bombs, missiles, rockets, or the like, and non-munitions, such as electronic equipment, devices, chaff, decoys, and/or the like. As another example, commercial aircraft can be configured to discharge various stores, such as products for delivery (which may be coupled to parachutes).

Known methods for internal store deployment include doors opening in the inboard or outboard direction about an axis that is parallel to a longitudinal axis of an aircraft. Such systems are configured to allow the stores to drop down from the aircraft. Such methods for store deployment are suitable for subsonic and supersonic store release.

However, in relation to hypersonic aircraft, extreme airloads and temperatures associated with store release make traditional known deployment methods impossible or next to impossible. In particular, during hypersonic flight, aerodynamic flow fields along with a turbulent boundary layer proximate to the hypersonic aircraft create strong shocks on surfaces (such as bay doors) protruding from a mold line of the aircraft. Additionally, cavity flow in a store bay can cause intense acoustic shocks on the bay structure. Further, air friction can generate extreme heat on surfaces of the hypersonic aircraft.

As such, for aircraft that operate at extremely high speeds (for example, hypersonic), in particular, continuous thermal and aerodynamic seals are typically needed at forward edges of in-flight deployable doors to prevent damage to internal structure or stores. Such seals are typically very stiff and require small deflections (stretching or bending) during operation. However, excessive preload induced into the stiff seals may cause failure and/or require frequent maintenance. Indeed, there is currently no known system and method for continuous thermal/aerodynamic sealing relation to in-flight deployable doors of hypersonic aircraft.

SUMMARY OF THE DISCLOSURE

A need exists for an efficient and effective system and method for operating a deployable door of an aircraft, such as during flight. Further, a need exists for a system and method for reducing seal deformation during operation of the deployable door.

With those needs in mind, certain embodiments of the subject disclosure provide a hinge assembly of a system for operating a door of an aircraft. The hinge assembly includes a bracket secured to a structure of the aircraft. The bracket includes a first forward joint and a first aft joint separated by a first distance. A forward link is coupled to the first forward joint. An aft link is longer than the forward link. The aft link is coupled to the first aft joint. A door coupler is secured to the door. The door coupler includes a second forward joint and a second aft joint separated by a second distance that is less than the first distance. The forward link is further coupled to the second forward joint, and the aft link is further coupled to the second aft joint.

In at least one embodiment, rotation of the forward link and the aft link causes rotation of the door coupler and the door between a stowed position in which a gap between a forward edge of the door and an outer skin of the aircraft is less than a predetermined distance, and an open position in which the gap is less than the predetermined distance.

In at least one embodiment, a seal is disposed between the outer skin of the aircraft and the door. The seal extends over the gap.

As an example, the predetermined distance is less than or equal to 0.030 inches.

In at least one embodiment, rotation of the forward link and the aft link causes rotation of the door about a pivot axis that is at or proximate to a forward edge of the door. In at least one embodiment, the pivot axis is at an outer mold line of the aircraft.

In at least one example, the aircraft is a hypersonic aircraft.

In at least one embodiment, the door coupler is secured to a top surface of the door at a forward edge of the door.

In at least one embodiment, the second forward joint is forward and below the first forward joint, and the second aft joint is forward and below the first aft joint.

Certain embodiments of the subject disclosure provide a method for providing a hinge assembly of a system for operating a door of an aircraft. The method includes securing a bracket secured to a structure of the aircraft, the bracket including a first forward joint and a first aft joint separated by a first distance; coupling a forward link to the first forward joint; coupling an aft link that is longer than the forward link to the first aft joint; securing a door coupler to the door, the door coupler including a second forward joint and a second aft joint separated by a second distance that is less than the first distance; coupling the forward link to the second forward joint; and coupling the aft link to the second aft joint.

Certain embodiments of the subject disclosure provide an aircraft including a system for operating a door, the system comprising a one or more hinge assemblies, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

In relation to certain types of aircraft, particularly high speed (for example, hypersonic) aircraft, extreme air-loads and temperatures during flight typically require that any deployed door (such as a bay door) has a continuous seal at a forward facing edge. Accordingly, embodiments of the subject disclosure provide a system for operating a door of an aircraft, which provides a virtual pivot point hinge assembly that facilitates a continuous seal at the forward facing edge. In at least one embodiment, the hinge assembly provides a fixed virtual pivot point (axis) at an outer mold line of the aircraft. The fixed pivot allows for a small gap between the door and the outer mold line, minimized or otherwise reduced thermal/aerodynamic seal flexing at the forward edge of deployable door, which, in turn allows for stronger (stiffer) seals to be used that are not or otherwise less susceptible to fatigue and damage.

As described herein, the system for operating the door of the aircraft provides one or more hinge assemblies that provide a virtual pivot point. The virtual point is at a fixed location at or proximate to an outer mold line of the aircraft, which minimizes or otherwise reduces deformation of the seal during operation (for example, opening and closing) of the door.

Figure 1:
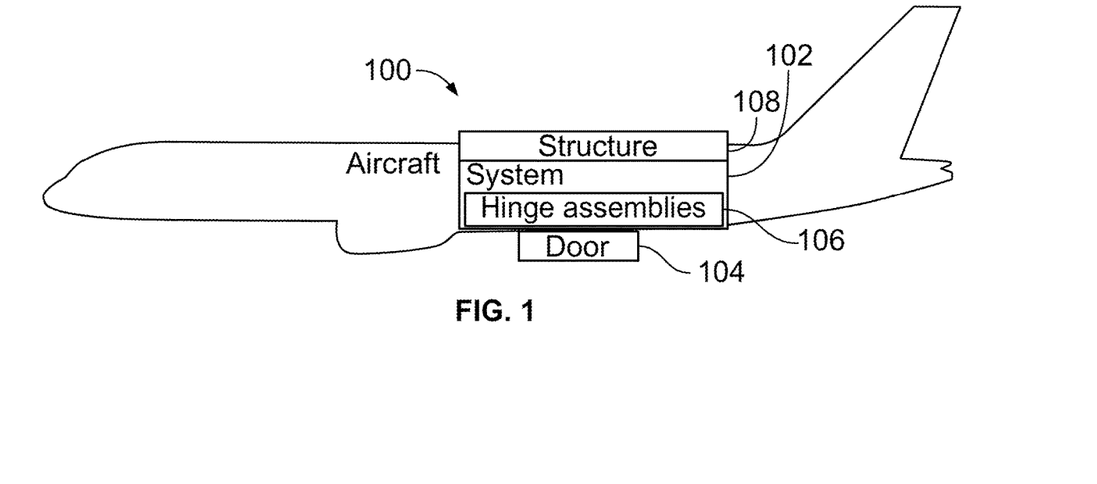
FIG. 1 illustrates a schematic block diagram of an aircraft including a system for operating a deployable door, according to an embodiment of the subject disclosure.

FIG. 1 illustrates a schematic block diagram of an aircraft 100 including a system 102 for operating a deployable door 104, according to an embodiment of the subject disclosure. The door 104 is configured to be moved between a stowed or closed position, and a deployed or open position. The system 102 includes one or more hinge assemblies 106 coupled to the door 104 and a fixed structure 108 of the aircraft 100. The hinge assemblies 106 are configured to move the door 104 between the stowed position and the deployed position.

The structure 108 can be one or more fixed internal components, such as within or proximate to an internal bay of the aircraft 100, For example, the internal bay is configured to house one or more stores, which can be ejected from the bay. Examples of the stores include munitions including bombs, missiles, rockets, or the like, non-munitions, such as electronic equipment, products for delivery, items for dissemination in an area (such as pamphlets, notices, or the like), and/or the like.

In at least one example, the aircraft 100 is a hypersonic aircraft. Optionally, the aircraft 100 can be a subsonic or supersonic aircraft. The aircraft 100 can be a military or commercial jet, for example. As another example, the aircraft 100 can be a rotor type aircraft, such as a helicopter. The aircraft 100 can be manned, such as operated by one or more pilots. As another example, the aircraft 100 can be an unmanned aerial vehicle, such as a drone.

Figure 2:
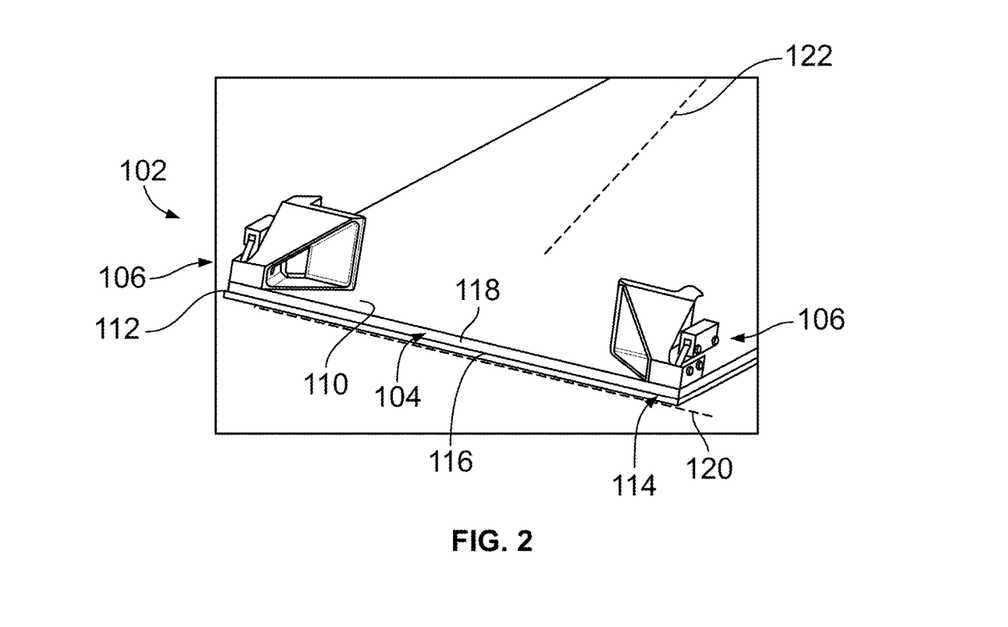
FIG. 2 illustrates a perspective front top view of the system for operating the deployable door, according to an embodiment of the subject disclosure.

FIG. 2 illustrates a perspective front top view of the system 102 for operating the deployable door 104, according to an embodiment of the subject disclosure. As shown, the system 102 includes a hinge assembly 106 secured on a top surface 110 of the door 104 at a right forward edge 112, and a hinge assembly 106 secured on the top surface 110 of the door 104 at a left forward edge 114. Each hinge assembly 106 is at or otherwise proximate to a forward edge 116 of the door 104. The system 102 can include more or less hinge assemblies 106 that shown. For example, the system 102 can include a single hinge assembly 106, such as at the right forward edge 112, the left forward edge 114, or a middle forward edge 118 of the door 104. As another example, the system 102 can include a first hinge assembly 106 at the right forward edge 112, a second hinge assembly 106 at the left forward edge 114, and a third hinge assembly 106 at the middle forward edge 118.

The hinge assemblies 106 are configured to pivot the door 104 between a stowed or closed position and a deployed or open position about a virtual pivot point or axis 120 proximate to the forward edge 116 of the door 104. The virtual pivot axis 120 is perpendicular to a longitudinal axis 122 of the door 104. In at least one embodiment, the longitudinal axis 122 of the door 104 is parallel to a longitudinal axis of the aircraft 100 (shown in FIG. 1).

Figure 3:
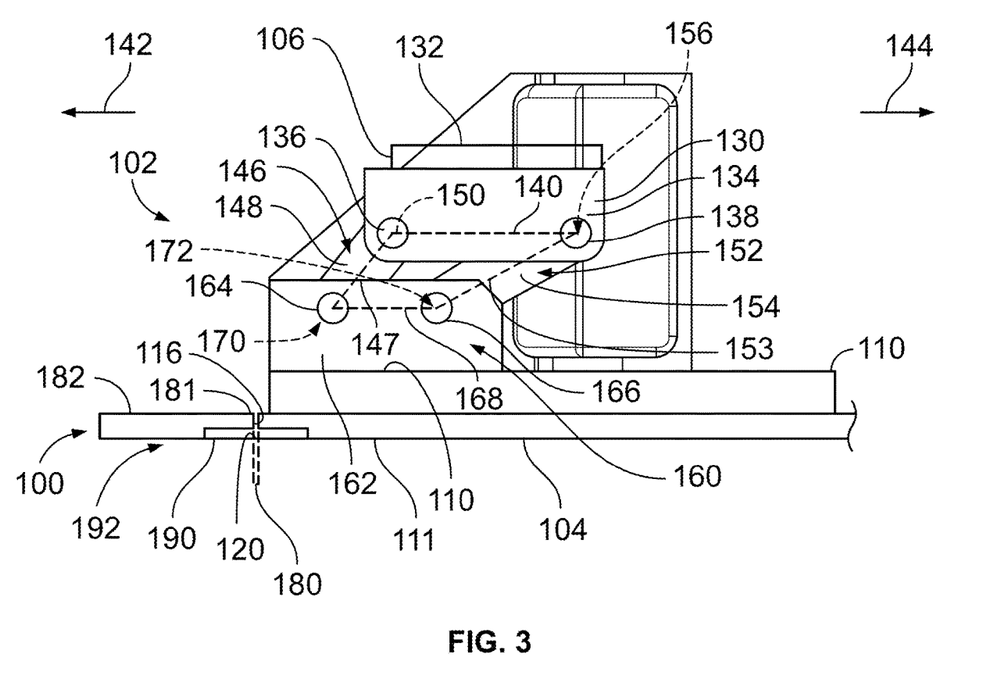
FIG. 3 illustrates a lateral view of the system for operating and/or rotating the deployable door between stowed and deployed positions.

FIG. 3 illustrates a lateral view of the system 102 for operating and/or rotating the deployable door 104 between stowed and deployed positions. The system 102 includes the hinge assemblies 106, as described herein. Each hinge assembly 106 includes a bracket 130 secured to structure 132 of the aircraft 100. For example, the structure 132 can be a fixed portion of a frame, wall, or the like within an internal bay of the aircraft 100. The bracket 130 functions as a ground link within the aircraft 100. The bracket 130 includes a housing 134 having a forward joint 136 (for example, a first forward joint) and an aft joint 138 (for example, a first aft joint). The forward joint 136 and the aft joint 138 are separated by a distance 140 (for example, a first distance).

A component is forward from another component when it is closer to a front portion 142 of the aircraft 100. Conversely, a component is aft from another component when it is closer to an aft portion 144 of the aircraft 100. For example, the forward joint 136 is closer to the front portion 142 of the aircraft 100 than the aft joint 138. Conversely, the aft joint 138 is closer to the aft portion 144 of the aircraft 100 than the forward joint 136.

The hinge assembly 106 also includes a forward link 146 coupled to the forward joint 136 of the bracket 130. The forward link 146 includes an arm 148 having an aft end 150 that pivotally couples to the forward joint 136 of the bracket 130.

The hinge assembly 106 also includes an aft link 152 that is longer than the forward link 146. That is, the forward link 146 has a first length 147, and the aft link 152 has a second length 153 that differs from the first length. In particular, the second length 153 is greater than the first length 147. The aft link 152 includes an arm 154 having an aft end 156 that pivotally couples to the aft joint 138 of the bracket 130.

The hinge assembly 106 also includes a door coupler 160 secured to the door 104. As shown, the door coupler 160 is secured to the top surface 110 of the door 104. The door coupler 160 also includes a housing 162 having a forward joint 164 (for example, a second forward joint) and an aft joint 166 (for example, a second aft joint). The forward joint 164 and the aft joint 166 are separated by a distance 168 (for example, a second distance). The distance 168 is less than the distance 140.

The forward link 146 is coupled to the forward joint 164 of the door coupler 160. The arm 148 includes a forward end 170 that pivotally couples to the forward joint 164 of the door coupler 160.

The aft link 152 is coupled to the aft joint 166 of the door coupler 160. The arm 154 of the aft link 152 includes a forward end 172 that pivotally couples to the aft joint 166 of the door coupler 160.

As shown, the forward link 146 pivotally couples to the door coupler 160 at the forward joint 164, which is forward and below the forward joint 136 of the bracket 130, where the aft end 150 of the forward link 146 pivotally couples to the bracket 130. The aft link 152 pivotally couples to the door coupler 160 at the aft joint 166, which is forward and below the aft joint 138 of the bracket 130, where the aft end 156 of the aft link 156 pivotally couples to the bracket 130.

In operation, rotation of the forward link 146 about the forward joint 136 of the bracket 130 and the forward joint 164 of the door coupler 160 and rotation of the aft link 152 about the aft joint 138 of the bracket 130 and the aft joint 166 of the door coupler 160 causes the door 104 to pivot between a stowed (or closed) position and a deployed (or open) position. As the door 104 pivots from the stowed position to the deployed position, a gap 180 between the forward edge 116 of the door 104 and an aft edge 181 of outer skin 182 of the aircraft 100 is less than a predetermined distance. For example, the predetermined distance of the gap 180 can be 0.030 inches. Optionally, the predetermined distance of the gap 180 can be greater than 0.030 inches (such as 0.050 inches), or less than 0.030 inches (such as 0.020 inches). In the stowed position, the gap 180 can be the predetermined distance. In the deployed position, as the door 104 rotates open, the gap 180 is maintained below the predetermined distance. For example, in the stowed position, the gap 180 is at the predetermined distance, which is greater than when the door 104 is in the deployed position.

A seal 190 is disposed between the outer skin 182 of the aircraft 100 and a lower surface 111 of the door 104. The seal 190 can be flush with the outer skin 182 and the lower surface 111 of the door 104. The seal 190 extends over the gap 180. As such, the seal 190 is configured to prevent airflow from passing into the gap 180 when the door 104 is in the stowed position and the deployed position. In at least one embodiment, the seal 190 is formed of a metal. For example, the seal 190 can be formed of the same material as the outer skin 182. As another example, the seal 190 can be formed of a composite material.

As the hinge assembly 106 operates to move the door 104 between the stowed position and the deployed position, the door 104 rotates about a pivot axis 120, which can be virtual in that is not a physical axle. Instead, the pivot axis 120 can be at a lower portion of the forward edge 114 of the door 104 and on or within the outer mold line 192 of the aircraft 100. The pivot axis 120 is at or proximate to the forward edge 116 of the door 104.

The first length 147 of the forward link 146, the second length 153 of the aft link 152, the first distance 140, and the second distance 168 are configured such that the door 104 rotates about the pivot axis 120, which is at or proximate to the forward edge 116. In particular, the first distance 140 being greater than the second distance 168, and the second distance 168 being greater than the first distance 140 provides the pivot axis 120 at or proximate to the forward edge 116 of the door 104.

In at least one embodiment, the first length 147 of the forward link 146, the second length 153 of the aft link 152, the first distance 140, and the second distance 168 are configured such that the pivot axis 120 of the door 104 is precisely located at (such as on or within) the outer mold line 192 of the aircraft 100. The pivot axis 120 provides an instant center, and is the axis about which the door coupler 160 appears to rotate as the hinge assembly 106 moves the door 104 between the stowed position and the deployed position. The instant center (that is, the pivot axis 120) is the center of a first circle having a radius and/or arc that is generally coincident with the radius or rotation of the forward link 146, and the center of a second circle having a radius and/or arc that is generally coincident with the radius or rotation of the aft link 152.

Referring to FIGS. 1-3, in at least one embodiment, the system 102 includes a pair of spaced apart hinge assemblies 106, with each of the hinge assemblies 106 including a bracket 130, a door coupler 160, a forward link 146 coupled to the bracket 130 and the door coupler 160, and an aft link 152 coupled to the bracket 130 and the door coupler 160, as described herein. The pair of spaced apart hinge assemblies 106 enables pivotal or rotational motion of the door 104 between the stowed position and the deployed position such that one side (such as a left side) of the door 104 is synchronized with an opposite side (such as a right side) of the door 104 to inhibit skewing as the door 104 moves between the stowed position and the deployed position.

Figure 4:
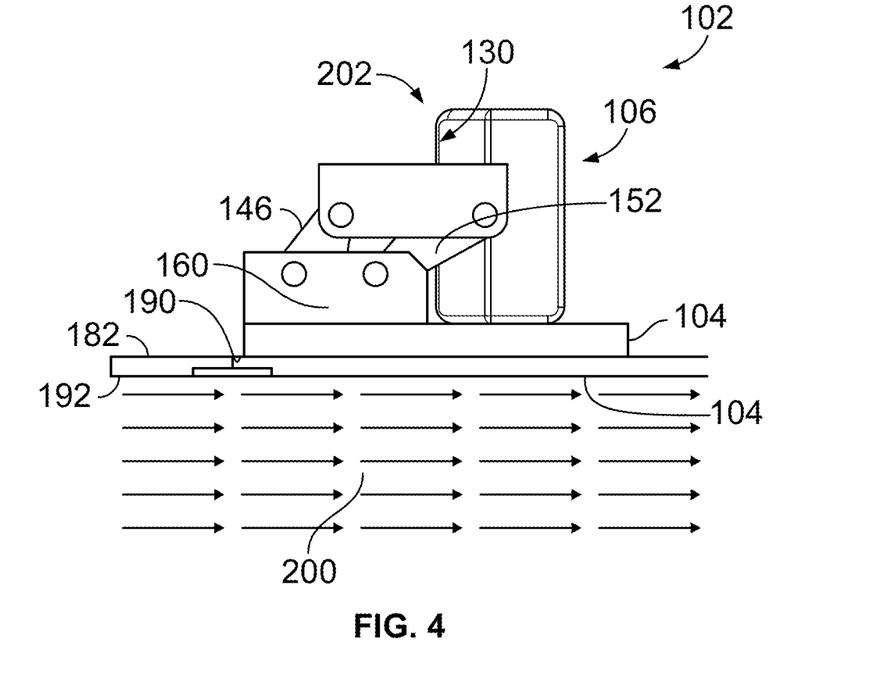
FIG. 4 illustrates a lateral view of the system for operating the deployable door having the door in a stowed position.

FIG. 4 illustrates a lateral view of the system 102 for operating the deployable door 104 having the door 104 in the stowed position. As shown, in the stowed position, the seal 190 covers the gap 180 (shown in FIG. 3), and is flush with the outer mold line 192 of the aircraft 100. The seal 190 prevents airflow 200 from passing into an internal bay 202 of the aircraft 100. The internal bay 202 can house one or more stores, for example.

Figure 5:
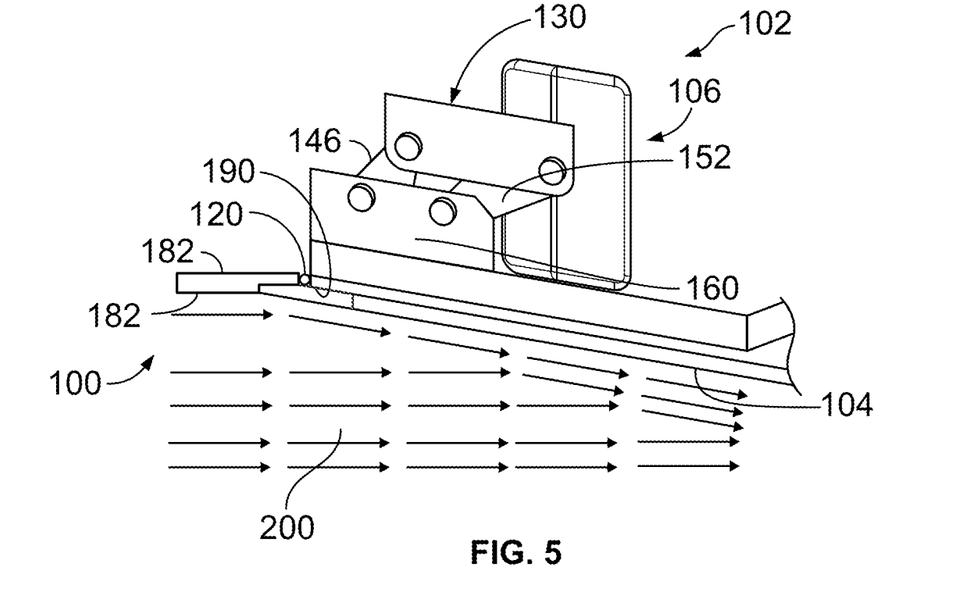
FIG. 5 illustrates a lateral view of the system for operating the deployable door having the door in a deployed position.

FIG. 5 illustrates a lateral view of the system 102 for operating the deployable door 104 having the door 104 in the deployed position. As the hinge assembly 106 operates to move the door 104 into the deployed position, the seal flexes, and remains flush with the outer mold line 192 of the aircraft 100, thereby preventing the airflow from passing into the internal bay 202 through the gap 180 (shown in FIG. 3).

Referring to FIGS. 1-5, the seal 190 provides a continuous sealing interface between the outer skin 182 and the forward edge 116 of the door 104 when the door 104 is in the stowed position, the deployed position, and all points therebetween. The configuration of hinge assembl(ies) 106, as described herein, allows the continuous seal 190 at the forward facing edge (that is, the forward edge 116) of the door 104. In particular, the first length 147 of the forward link 146, the second length 153 of the aft link 152, the first distance 140, and the second distance 168 provide the pivot axis 120 at (such as on or within) the outer mold line 192 of the aircraft 100. The pivot axis 120 allows for a small gap 180 between the door 104 and the outer mold line 192, and reduces flexing of the seal 190, thereby reducing fatigue and/or damage to the seal 190.

Each hinge assembly 106 provides a four bar linkage, such that the links include the bracket 130, the forward link 146, the aft link 152, and the door coupler 160. The hinge assemblies 106 allow the door to be rotated between the stowed position and the deployed position at a relatively small angle. For example, the rotation angle can be less than 10°. In particular, the rotation angle can be less than 7°, such as 6.2°. The location of the pivot axis 120 at the outer mold line 192 and the small rotation angle provides for a small gap 180, such as less than 0.030 inches. Accordingly, the seal 190 experiences a small amount of deflection as the door 104 is moved between stowed and deployed positions. Because the hinge assemblies 106 allow for minimized or otherwise reduced deflection of the seal 190, the preload applied on the seal 190 is limited, and the seal 190 can therefore be constructed of materials having increased stiffness and resilience.

Figure 6:
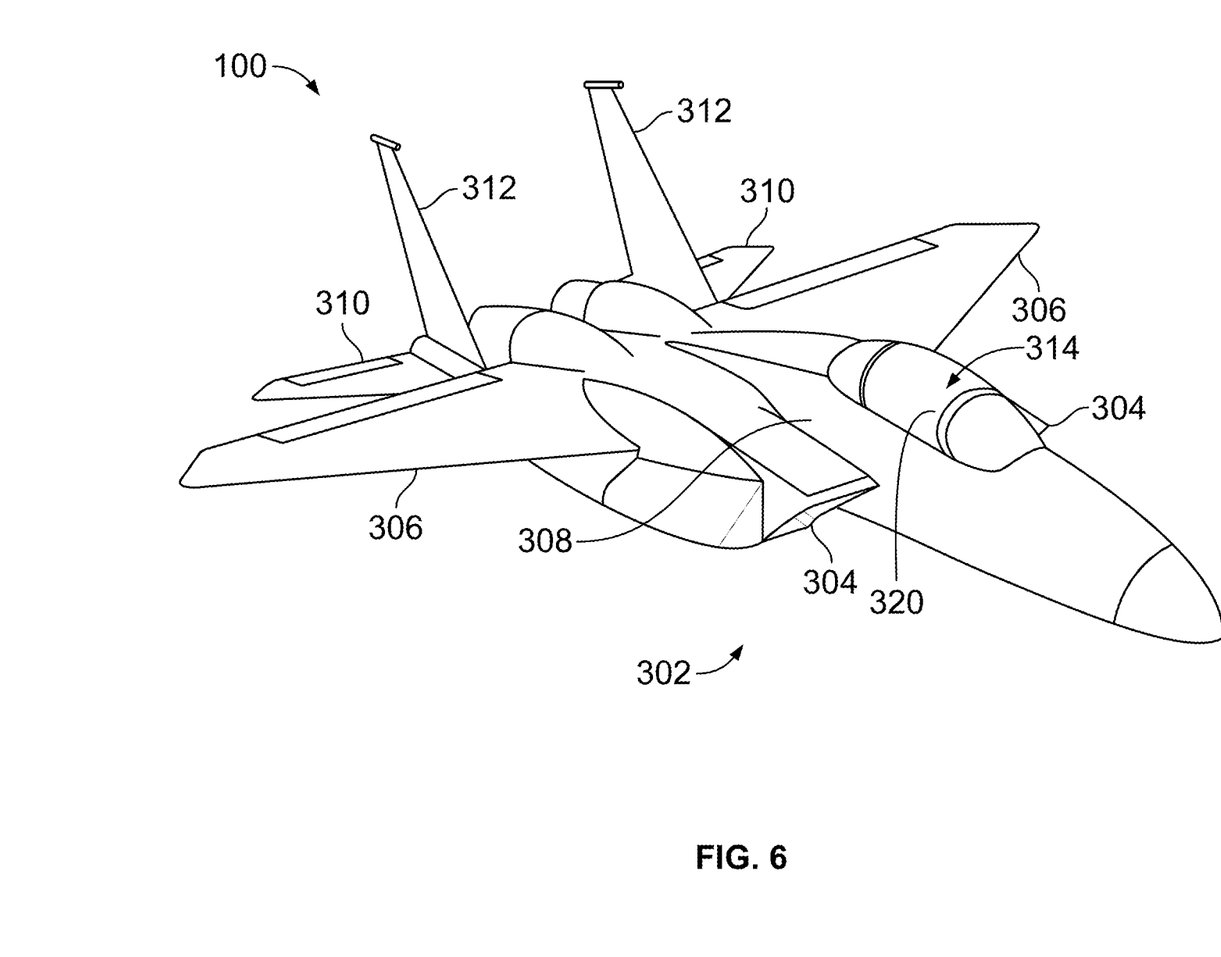
FIG. 6 illustrates a perspective front view of an aircraft, according to an embodiment of the subject disclosure.

FIG. 6 illustrates a perspective front view of an aircraft 100, according to an example of the subject disclosure. As shown, the aircraft 100 can be a military fighter jet. In at least one embodiment, the aircraft 100 is a hypersonic jet. The aircraft 100 includes a propulsion system 302 that includes two engines 304, for example. Optionally, the propulsion system 302 may include more or less engines 304 than shown. The engines 304 are carried by wings 306 and/or a fuselage 308 of the aircraft 100. In other embodiments, the engines 304 may be carried by other portions of the aircraft 100. The fuselage 308 also supports horizontal stabilizers 310 and vertical stabilizers 312. The fuselage 308 of the aircraft 100 includes a cockpit 314 covered by a canopy 320. Optionally, the aircraft 100 may be various other types of military aircraft, which may or may not include wings. For example, the aircraft 100 may be a helicopter. Alternatively, the aircraft may be various types of commercial aircraft, such as commercial jets, helicopters, or the like. As another example, the aircraft 100 can be an unmanned aerial vehicle (UAV). The aircraft 100 includes the system 102, as shown and described with respect to FIGS. 1-5.

Figure 7:
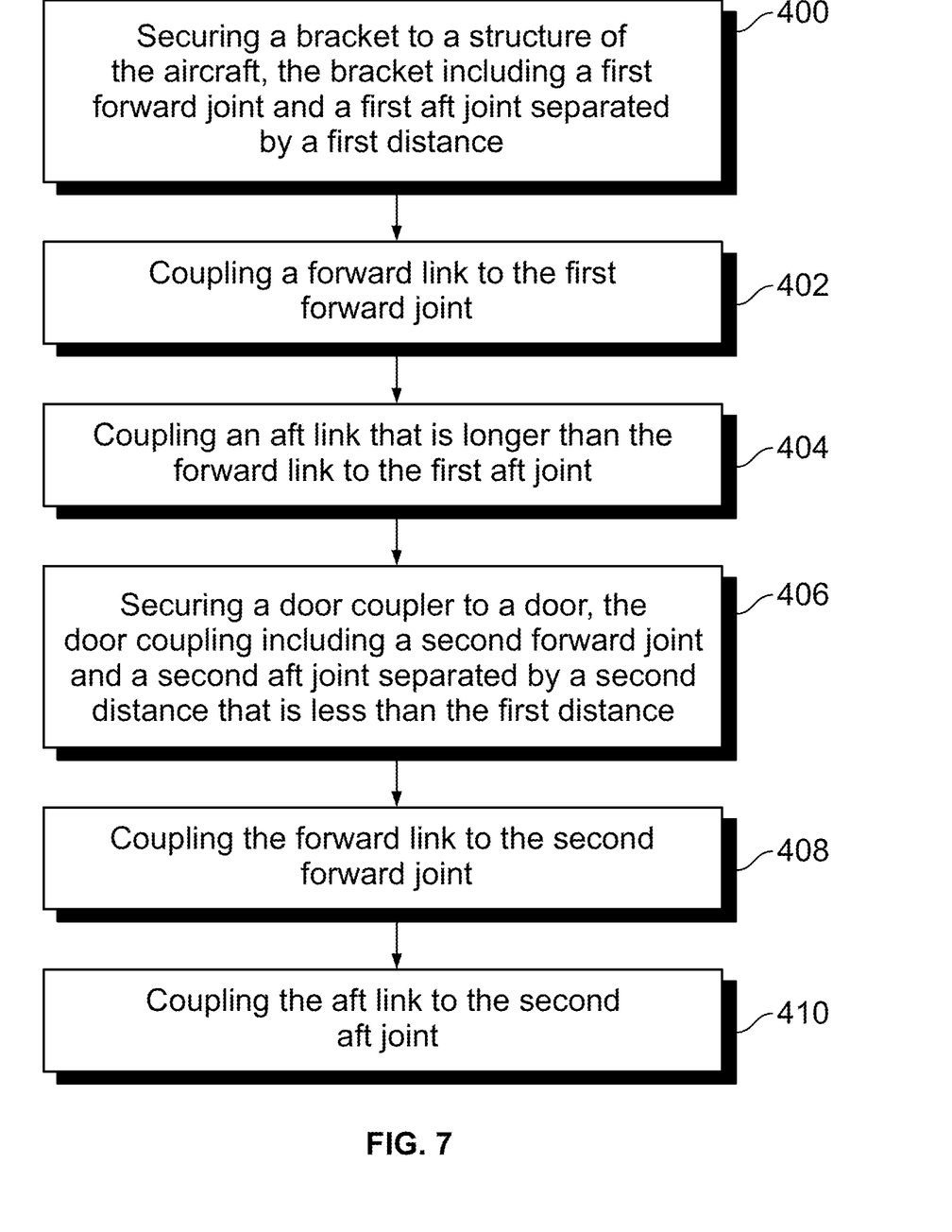
FIG. 7 illustrates a flow chart of a method for providing a hinge assembly of a system for operating a door of an aircraft, according to an embodiment of the subject disclosure.

FIG. 7 illustrates a flow chart of a method for providing a hinge assembly of a system for operating a door of an aircraft, according to an embodiment of the subject disclosure. Referring to FIGS. 1-7, the method includes securing, at 400, a bracket 130 secured to a structure 108 of the aircraft 100. The bracket 130 includes a first forward joint 136 and a first aft joint 138 separated by a first distance 140. The method also includes coupling, at 402, a forward link 146 to the first forward joint 136; coupling, at 404, an aft link 152 that is longer than the forward link 146 to the first aft joint 138; and securing, at 406, a door coupler 160 to a door 104. The door coupler includes a second forward joint 164 and a second aft joint 166 separated by a second distance 168 that is less than the first distance 140. The method also includes coupling, at 408, the forward link 146 to the second forward joint 164; and coupling, at 410, the aft link 152 to the second aft joint 166.

In at least one embodiment, the method also includes rotating the forward link 146 and the aft link 152 to rotate the door coupler 160 and the door 104 between a stowed position in which a gap 180 between a forward edge 116 of the door 104 and an outer skin 182 of the aircraft 100 is less than a predetermined distance, and an open position in which the gap 180 is less than the predetermined distance. In at least one embodiment, the method also includes disposing a seal 190 between the outer skin 182 of the aircraft 100 and the door 104, wherein the seal 190 extends over the gap 180.

In at least one embodiment, the method includes rotating the forward link 146 and the aft link 152 to rotate the door 104 about a pivot axis 120 that is at or proximate to a forward edge 116 of the door 104. In at least one example, the pivot axis 120 is at an outer mold line 192 of the aircraft 100.

In at least one embodiment, said securing 406 the door coupler 160 to the door 104 includes securing the door coupler 160 to a top surface 110 of the door 104 at a forward edge 116 of the door 104.

Further, the disclosure comprises examples according to the following clauses:

Clause 1. A hinge assembly of a system for operating a door of an aircraft, the hinge assembly comprising:
 a bracket secured to a structure of the aircraft, the bracket including a first forward joint and a first aft joint separated by a first distance;
 a forward link coupled to the first forward joint;
 an aft link that is longer than the forward link, the aft link coupled to the first aft joint; and
 a door coupler secured to the door, the door coupler including a second forward joint and a second aft joint separated by a second distance that is less than the first distance, the forward link is further coupled to the second forward joint, and the aft link is further coupled to the second aft joint.

Clause 2. The hinge assembly of Clause 1, wherein rotation of the forward link and the aft link causes rotation of the door coupler and the door between a stowed position in which a gap between a forward edge of the door and an outer skin of the aircraft is less than a predetermined distance, and an open position in which the gap is less than the predetermined distance.

Clause 3. The hinge assembly of Clause 2, further comprising a seal disposed between the outer skin of the aircraft and the door, wherein the seal extends over the gap.

Clause 4. The hinge assembly of Clauses 2 or 3, wherein the predetermined distance is less than or equal to 0.030 inches.

Clause 5. The hinge assembly of any of Clauses 1-4, wherein rotation of the forward link and the aft link causes rotation of the door about a pivot axis that is at or proximate to a forward edge of the door.

Clause 6. The hinge assembly of Clause 5, wherein the pivot axis is at an outer mold line of the aircraft.

Clause 7. The hinge assembly of any of Clauses 1-6, wherein the aircraft is a hypersonic aircraft.

Clause 8. The hinge assembly of any of Clauses 1-7, wherein the door coupler is secured to a top surface of the door at a forward edge of the door.

Clause 9. The hinge assembly of any of Clauses 1-8, wherein the second forward joint is forward and below the first forward joint, and wherein the second aft joint is forward and below the first aft joint.

Clause 10. A method for providing a hinge assembly of a system for operating a door of an aircraft, the method comprising:
 securing a bracket secured to a structure of the aircraft, the bracket including a first forward joint and a first aft joint separated by a first distance;
 coupling a forward link to the first forward joint;
 coupling an aft link that is longer than the forward link to the first aft joint;
 securing a door coupler to the door, the door coupler including a second forward joint and a second aft joint separated by a second distance that is less than the first distance;
 coupling the forward link to the second forward joint; and
 coupling the aft link to the second aft joint.

Clause 11. The method of Clause 10, further comprising rotating the forward link and the aft link to rotate the door coupler and the door between a stowed position in which a gap between a forward edge of the door and an outer skin of the aircraft is less than a predetermined distance, and an open position in which the gap is less than the predetermined distance.

Clause 12. The method of Clause 11, further comprising disposing a seal between the outer skin of the aircraft and the door, wherein the seal extends over the gap.

Clause 13. The method of any of Clauses 10-12, further comprising rotating the forward link and the aft link to rotate the door about a pivot axis that is at or proximate to a forward edge of the door.

Clause 14. The method of Clause 13, wherein the pivot axis is at an outer mold line of the aircraft.

Clause 15. The method of any of Clauses 10-14, wherein said securing the door coupler to the door comprises securing the door coupler to a top surface of the door at a forward edge of the door.

Clause 16. The method of any of Clauses 10-15, wherein the second forward joint is forward and below the first forward joint, and wherein the second aft joint is forward and below the first aft joint.

Clause 17. An aircraft comprising:
 a system for operating a door, the system comprising a plurality of hinge assemblies, each of the hinge assemblies comprising:
  a bracket secured to a structure of the aircraft, the bracket including a first forward joint and a first aft joint separated by a first distance;
  a forward link coupled to the first forward joint;
  an aft link that is longer than the forward link, the aft link coupled to the first aft joint; and
  a door coupler secured to a top surface of the door at a forward edge of the door, the door coupler including a second forward joint and a second aft joint separated by a second distance that is less than the first distance, wherein the second forward joint is forward and below the first forward joint, and wherein the second aft joint is forward and below the first aft joint, the forward link is further coupled to the second forward joint, and the aft link is further coupled to the second aft joint, wherein rotation of the forward link and the aft link causes rotation of the door coupler and the door between a stowed position in which a gap between a forward edge of the door and an outer skin of the aircraft is less than a predetermined distance, and an open position in which the gap is less than the predetermined distance; and
 a seal disposed between the outer skin of the aircraft and the door, wherein the seal extends over the gap.

Clause 18. The aircraft of Clause 17, wherein the predetermined distance is less than or equal to 0.030 inches.

Clause 19. The aircraft of Clauses 17 or 18, wherein rotation of the forward link and the aft link causes rotation of the door about a pivot axis that is at or proximate to a forward edge of the door, and wherein the pivot axis is at an outer mold line of the aircraft.

Clause 20. The aircraft of any of Clauses 17-20, wherein the aircraft is a hypersonic aircraft.

As described herein, certain embodiments of the subject disclosure provide an efficient and effective system and method for operating a deployable door of an aircraft, such as during flight. Further, embodiments of the subject disclosure provide systems and methods for reducing seal deformation during operation of the deployable door.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A hinge assembly of a system for operating a door of an aircraft, the hinge assembly comprising:
 a bracket secured to a structure of the aircraft, the bracket including a first forward joint and a first aft joint separated by a first distance along a first line;
 a forward link coupled to the first forward joint;
 an aft link that is longer than the forward link, the aft link coupled to the first aft joint; and a door coupler secured to the door, the door coupler including a second forward joint and a second aft joint separated by a second distance that is less than the first distance, wherein the second distance is along a second line that is parallel to the first line in a stowed position, the forward link is further coupled to the second forward joint, and the aft link is further coupled to the second aft joint.

2. The hinge assembly of claim 1, wherein rotation of the forward link and the aft link causes rotation of the door coupler and the door between the stowed position in which a gap between a forward edge of the door and an outer skin of the aircraft extends over third distance, and an open position in which the gap is less than the third distance.

3. The hinge assembly of claim 2, further comprising a seal disposed between the outer skin of the aircraft and the door, wherein the seal extends over the gap.

4. The hinge assembly of claim 2, wherein the third distance is less than or equal to 0.030 inches.

5. The hinge assembly of claim 1, wherein rotation of the forward link and the aft link causes rotation of the door about a pivot axis that is at or proximate to a forward edge of the door.

6. The hinge assembly of claim 5, wherein the pivot axis is at an outer mold line of the aircraft.

7. The hinge assembly of claim 1, wherein the aircraft is a hypersonic aircraft.

8. The hinge assembly of claim 1, wherein the door coupler is secured to a top surface of the door at a forward edge of the door.

9. The hinge assembly of claim 1, wherein the second forward joint is forward and below the first forward joint, and wherein the second aft joint is forward and below the first aft joint.

10. A method for providing a hinge assembly of a system for operating a door of an aircraft, the method comprising:
  securing a bracket secured to a structure of the aircraft, the bracket including a first forward joint and a first aft joint separated by a first distance along a first line;
  coupling a forward link to the first forward joint;
  coupling an aft link that is longer than the forward link to the first aft joint;
  securing a door coupler to the door, the door coupler including a second forward joint and a second aft joint separated by a second distance that is less than the first distance, wherein the second distance is along a second line that is parallel to the first line in a stowed position;
  coupling the forward link to the second forward joint; and
  coupling the aft link to the second aft joint.

11. The method of claim 10, further comprising rotating the forward link and the aft link to rotate the door coupler and the door between the stowed position in which a gap between a forward edge of the door and an outer skin of the aircraft extends over a third distance, and an open position in which the gap is less than the third distance.

12. The method of claim 11, further comprising disposing a seal between the outer skin of the aircraft and the door, wherein the seal extends over the gap.

13. The method of claim 10, further comprising rotating the forward link and the aft link to rotate the door about a pivot axis that is at or proximate to a forward edge of the door.

14. The method of claim 13, wherein the pivot axis is at an outer mold line of the aircraft.

15. The method of claim 10, wherein said securing the door coupler to the door comprises securing the door coupler to a top surface of the door at a forward edge of the door.

16. The method of claim 10, wherein the second forward joint is forward and below the first forward joint, and wherein the second aft joint is forward and below the first aft joint.

17. An aircraft comprising:
  a system for operating a door, the system comprising a plurality of hinge assemblies, each of the hinge assemblies comprising:
    a bracket secured to a structure of the aircraft, the bracket including a first forward joint and a first aft joint separated by a first distance;
    a forward link coupled to the first forward joint;
    an aft link that is longer than the forward link, the aft link coupled to the first aft joint; and
    a door coupler secured to a top surface of the door at a forward edge of the door, the door coupler including a second forward joint and a second aft joint separated by a second distance that is less than the first distance, wherein the second forward joint is forward and below the first forward joint, and wherein the second aft joint is forward and below the first aft joint, the forward link is further coupled to the second forward joint, and the aft link is further coupled to the second aft joint, wherein rotation of the forward link and the aft link causes rotation of the door coupler and the door between a stowed position in which a gap between a forward edge of the door and an outer skin of the aircraft is less than a predetermined distance, wherein the first distance is along a first line, and wherein the second distance is along a second line that is parallel to the first line in the stowed position, and an open position in which the gap is less than the predetermined distance, and wherein rotation of the forward link and the aft link causes rotation of the door about a pivot axis that is at or proximate to a forward edge of the door, and wherein the pivot axis is at an outer mold line of the aircraft; and
  a seal disposed between the outer skin of the aircraft and the door, wherein the seal extends over the gap.

18. The aircraft of claim 17, wherein the predetermined distance is less than or equal to 0.030 inches.

19. The aircraft of claim 17, wherein the aircraft is a hypersonic aircraft.

20. The method of claim 10, wherein the aircraft is a hypersonic aircraft.

* * * * *